United States Patent
Jain et al.

(10) Patent No.: US 9,557,881 B1
(45) Date of Patent: Jan. 31, 2017

(54) GRAPHICAL USER INTERFACE FOR TRACKING AND DISPLAYING USER ACTIVITIES OVER A PREDETERMINED TIME PERIOD

(71) Applicant: Google Inc., Mountain View, CA (US)

(72) Inventors: Nibha Jain, San Francisco, CA (US); William Davis Bates, San Francisco, CA (US); Heather Lynn Traher, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 258 days.

(21) Appl. No.: 14/160,182

(22) Filed: Jan. 21, 2014

(51) Int. Cl.
   G06F 3/048 (2013.01)
   G06F 3/0481 (2013.01)
   G06F 3/0484 (2013.01)

(52) U.S. Cl.
   CPC ......... G06F 3/0481 (2013.01); G06F 3/04845 (2013.01)

(58) Field of Classification Search
   USPC ........ 715/834, 764, 771, 712, 859; 345/440, 345/619, 661
   See application file for complete search history.

(56) References Cited

U.S. PATENT DOCUMENTS

| | | | | |
|---|---|---|---|---|
| 5,273,320 A * | 12/1993 | deMaCarty | ............. | G06C 1/00 283/117 |
| 7,274,375 B1 * | 9/2007 | David | ................... | G06Q 10/06 345/619 |
| 8,843,824 B1 * | 9/2014 | Daly, IV | ............. | G06F 3/04817 715/712 |
| 8,902,715 B2 * | 12/2014 | Tu | ......................... | G04G 21/08 368/223 |
| 2002/0054040 A1 * | 5/2002 | Moshal | ................. | G06Q 40/04 345/440 |
| 2011/0004835 A1 * | 1/2011 | Yanchar | ............... | G06Q 10/109 715/763 |
| 2012/0066629 A1 * | 3/2012 | Lee | ..................... | G06F 3/04847 715/769 |
| 2013/0027412 A1 * | 1/2013 | Roddy | ................ | F24F 11/0086 345/501 |
| 2013/0110623 A1 * | 5/2013 | Kilroy | ................ | G06Q 30/0277 705/14.53 |
| 2014/0074653 A1 * | 3/2014 | Wang | ................ | G06Q 30/0631 705/26.7 |

\* cited by examiner

Primary Examiner — Doon Chow
Assistant Examiner — Wendy Nicholas
(74) Attorney, Agent, or Firm — Lowenstein Sandler LLP

(57) ABSTRACT

A system for generating a graphical user interface for tracking and displaying user activities over a predetermined time period is provided. The system includes a presentation component configured to display a graphical user interface that facilitates receiving user input regarding daily activities of the user, wherein the interface comprises a chart comprising a plurality of input compartments defined by a plurality of concentric circles divided into a plurality of slices, wherein each of the concentric circles are associated with a different input category and each of the slices are associated with a different time frame of a time period.

15 Claims, 14 Drawing Sheets

GRAPHICAL USER INTERFACE FOR TRACKING AND DISPLAYING USER ACTIVITIES OVER A PREDETERMINED TIME PERIOD

TECHNICAL FIELD

This disclosure relates a graphical user interface for tracking and displaying user activities over a predetermined time period.

BACKGROUND

A variety of computing applications and networked systems are gaining popularity due to the ability to provide personalized services to users. However collecting data from human subjects to determine statistical associations that facilitate provision of personalized services can be particularly difficult. For example, many aspects of human behavior are associated with short time-scale neurological responses. High sampling rates are often needed in order to capture these events accurately. In turn, the high sampling rates often result in the collection of a significant amount of information. Questionnaire methods generally result in a large number of questions which can be time consuming and annoying for subjects to answer. As a consequence, the subjects may not answer the questions or may answer the questions in a hap-hazard or sloppy fashion, thereby degrading the quality of the collected data and potentially adversely impacting any subsequent statistical analysis.

Similarly, many human activities have a wide range of variations on a common theme, which can be difficult to capture in a succinct manner using a common questionnaire. For example, there are often a large number of permutations on the activities users perform throughout the day. Explicitly including all of these permutations can result in a very large number of potential answers that subjects may need to sort through when answering questions about their daily routines. This can be time consuming and annoying for the subjects. Thus, this approach to data collection may also result in questions that are not answered or hap-hazard or sloppy answers, which can also degrade the quality of the collected data and potentially adversely impact any subsequent statistical analysis.

DETAILED DESCRIPTION

Figure 1:
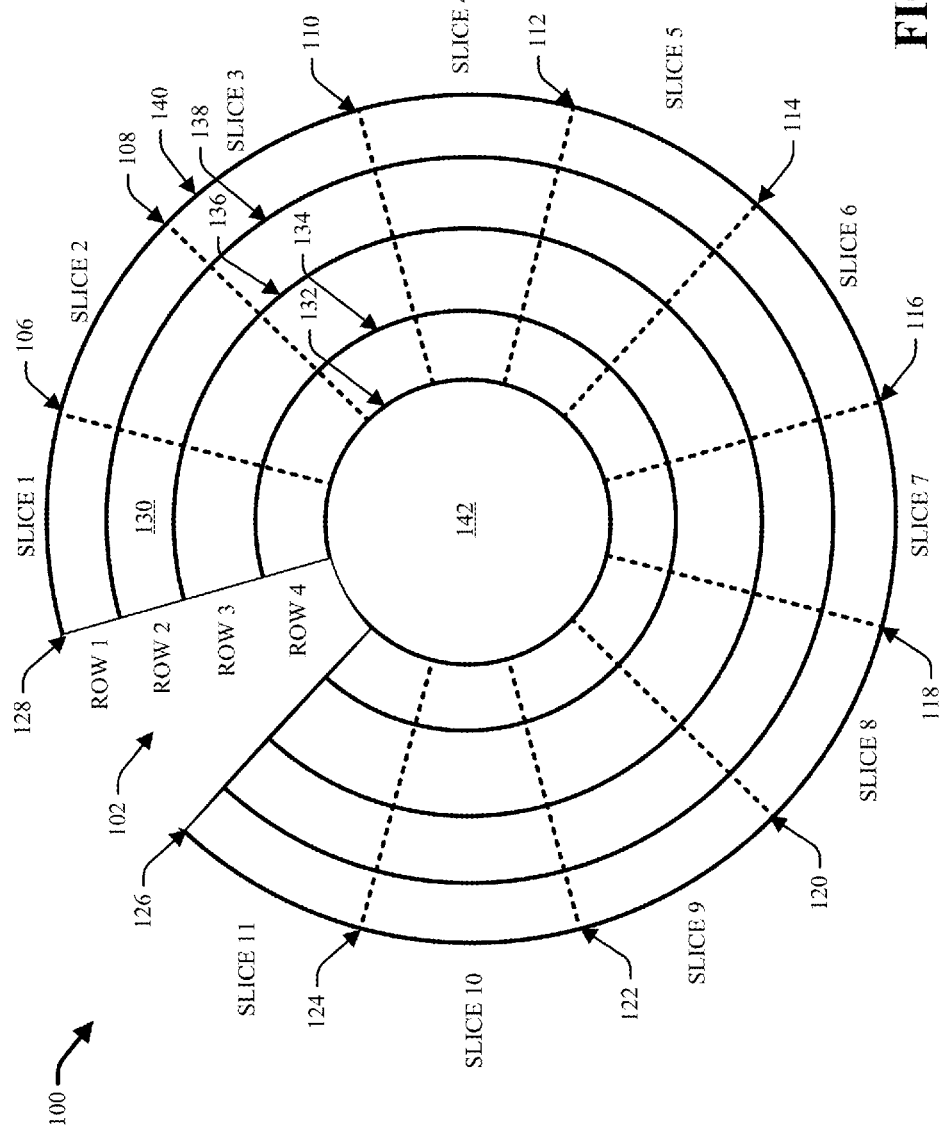
FIG. 1 illustrates a block diagram of an example GUI activities grid in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to a graphical user interface (GUI) that facilitates tracking and displaying information pertaining to user behavior or activities over a predetermined time period. The interface can serve as a data entry tool that facilitates receiving input into different areas of GUI activities grid that includes a plurality of cells divided by a plurality of columns and rows. Each of the columns can correspond to a sequential category, such as sequential segment of time (e.g., minute, hour, day, etc.), and each of the rows can correspond to a sequential or non-sequential category representing an attribute or action that can be associated with one or more of the sequential categories represented by the rows. For example, a GUI activities grid can include a plurality of different rows that respectively correspond to different activities a user performs throughout a day. According to this example the columns can include 24 columns corresponding to the 24 hours in a day. Cells at respective intersections of rows and columns will thus correspond to a respective activity at a respective hour of a day. The respective cells of the GUI grid can further be marked (e.g., either by a user or automatically) in response to occurrence of the respective activities at the respective hours of the day.

However, unlike conventional data entry organizational tools which are arranged in a linear (e.g., a list or rectangular spreadsheet) manner, the subject graphical input chart is formed as a circle divided into a plurality of different input compartments or cells. In particular, the chart includes a plurality of concentric circles. Each of the concentric circles can be partitioned using a plurality of radial lines originating from a single center point shared by each of the concentric circles and extending to the perimeter of the outermost circle. In other words, the plurality of concentric circles can be divided into a plurality of triangular slices resembling slices of a pie. Each "pie slice" can represent a grid column and correspond to a sequential category, such as a segment of time within a set time period. For example, each pie slice can represent an hour of a 24 hour day, or each pie slice can represent 10 minutes of a 60 minute period.

Further, each concentric circle can represent a grid row and correspond to a sequential or non-sequential attribute or activity that can be associated with one or more of the sequential categories that correspond to the respective pie slices. For example, each concentric circle can define a characteristic or aspect of a user's life. For instance, a first concentric circle can define a location category that can be used to input a user's location. Another concentric circle can define a device that can be used to indicate a type of device employed by the user. Another concentric circle can be used to represent a type of activity, such as work, philanthropy, gym, social, etc. With the subject GUI activities grid, a user can easily input data into respective areas of the concentric circles for the aspects of the user's life that occur at the different times defined by the respective slices.

In one or more aspects, a system is provided that includes a presentation component configured to display a GUI that facilitates receiving user input regarding daily activities of the user. The interface includes a chart comprising a plurality of input compartments defined by a plurality of concentric circles divided into a plurality of slices, wherein each of the concentric circles are associated with a different input category and each of the slices are associated with a different time frame of a time period.

In another aspect, a method is provided that includes generating a graphical user interface that facilitates receiving user input regarding daily activities of the user, wherein the interface comprises a chart comprising a plurality of input compartments defined by a plurality of concentric circles divided into a plurality of slices, wherein each of the concentric circles are associated with a different input category and each of the slices are associated with a different time frame of a time period. The method further includes presenting the graphical user interface via a display screen of a device.

Further provided is a tangible computer-readable storage medium comprising computer-readable instructions that, in response to execution, cause a computing system to perform various operations. The operations can include generating a graphical user interface that facilitates receiving user input regarding daily activities of the user, wherein the interface comprises a chart comprising a plurality of input compartments defined by a plurality of concentric circles divided into a plurality of slices, wherein each of the concentric circles are associated with a different input category and each of the slices are associated with a different time frame of a time period. The operations further include presenting the graphical user interface via a display screen of a device.

Referring now to the drawings, FIG. 1 depicts an example activities grid 100 or map configured for generation and display via a graphical user interface in accordance with aspects and embodiments described herein. For example, activities grid 100 can be generated and displayed via a computing device and facilitate tracking, displaying and organizing information pertaining to events and attributes of a user of the device over the course of a predetermined time period.

Activities grid 100 includes a plurality of input compartments or cells (e.g., cell 130) defined by a plurality rows (e.g., row 1, row 2, row 3 and row 4) and radial columns or slices (e.g., slices 1-11). The plurality of rows are established via a plurality of concentric circles 132, 134, 136, 138 and 140. The plurality of radial slices are established (e.g., slices 1-11) by a plurality of radial lines (e.g., lines 106, 108, 110, 112, 114, 116, 118, 120, 122, 124, 126 and 128) extending from a center point shared by the respective concentric circles. It should be appreciated that although four rows and eleven slices are included in example activities grid 100, activities grids or maps disclosed herein can include any number N of rows and any number M of slices. In addition, the dimension (e.g., diameter, width, arc length, etc.) of the respective rows and slices can vary. For example, the respective rows can have equal or disparate widths. Similarly, the respective slices can have equal or disparate dimensions. Activities grid 100 can include a label section 102 in which information identifying the respective rows 1-4 can be provided. Information labeling the respective slices can be associated with the respective slices around the perimeter of the outermost concentric circle 140.

Activities grid 100 can be employed as a data entry tool wherein the data can be entered into or associated with the respective cells or compartments of the grid. In particular, activities grid 100 can facilitate organizing data that can be associated with two or more attributes, wherein at least one attribute is defined by a row in which the data is included and at least another attribute is defined by a slice in which the data is included. For example, data entered into cell 130 is associated with an attribute represented by row 2 and another attributed represented by slice 1. Accordingly, each of the rows 1-4 of activities grid 100 can represent different input categories and each or the slices 1-11 can represent different input categories. The type of information category that is represented by a row and column of activities grid 100 can vary based on the intended use of the activities grid.

The data that can be entered in the respective cells of activities grid 100 can vary. In an aspect, the respective cells can receive and present text. For example, text can be entered (e.g., by a user or automatically) into respective cells describing information associated with the respective cells. In another aspect, the cells can receive symbols to represent data associated with the respective cells (e.g., check marks, thumbnails, icons, etc.). In another aspect, the cells can be filled in with different colors, marks or patterns to represent information associated with the respective cells. For example, where the respective slices represent sequential hours of a day and row 1 represents a location of home, over the course of the day when a user is home, the user can color in the respective cells of row 1 that correspond to slices representing times when the user is home.

In an aspect, each of the slices of activities grid 100 can represent sequential information categories. For example, each of the slices 1-11 can represent a sequential segment of time of a predefined time period. According to this example, the respective slices can represent sequential minutes, hours, days, weeks etc. In another example, each of the slices can represent sequential events of a schedule, sequential rounds in a game, or sequential frames of a video. Further, each of the rows can represent an attribute or activity that can be associated with one or more of the respective slices. For example, where the respective slices represent sequential hours in a day, each of the rows can be associated with a user activity that could occur during one or more hours of the day. According to this example, activities grid 100 can be used to chart user activities that occur over the course of the respective time frames represented by the respective slices. In another example, where the respective slices represent sequential frames in a video, each of the respective rows can represent an actor or object that appears in the video. According to this example, grid 100 can be used to track the appearance of the different actors or objects as they appear in the respective frames of the video represented by the respective slices. It should be appreciated that the categories represented by the respective rows and slices of activities grids defined herein are not limited to the examples described.

In an aspect, activities grid 100 can be used to efficiently track activities of a user over the course of a daily period. According to this aspect, activities grid 100 can be divided into a plurality of slices wherein each of the respective slices can represent an hour of a twenty four hour period. Each or the rows can further represent an activity or attribute associated with the user's day. For example, different rows can represent different activities the user participates in during the course of a day (e.g., work, driving, eating, sleeping, exercise, social, philanthropy, etc.). Different rows can also represent different locations the user visits throughout the day, different devices the user employs throughout the day different people the user interacts with, or different moods the user is feeling throughout the day. In essence, different rows can be associated with various categories that can describe various aspects of a users day while the different slices can capture when the aspects sequentially occur. According to this aspect, activities grid 100 can easily present and organize an entire days worth of information in a single organized diagram that can be easily interpreted by a user.

Figure 2:
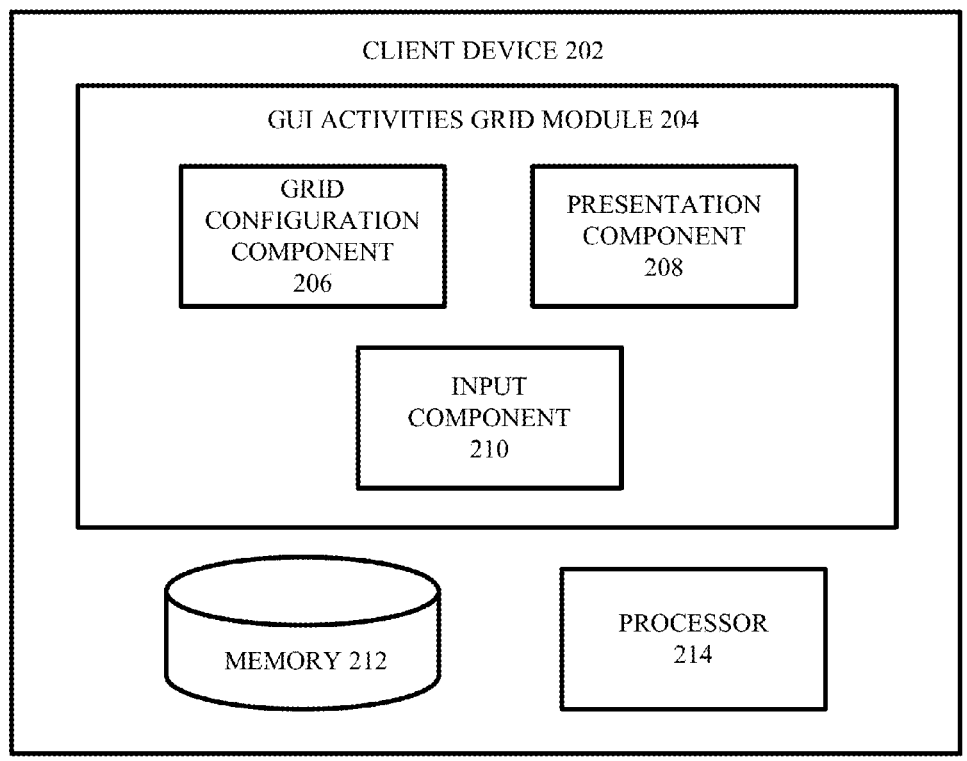
FIG. 2 illustrates a block diagram of an example system that facilitates tracking and displaying user activities over a predetermined time period in accordance with various aspects and embodiments described herein.

FIG. 2 presents an example client device 200 having a (GUI) activities grid module 204 for generating and presenting an activities grid (e.g., grid 100 and the like) in accordance with aspects and embodiments described herein. Aspects of the interfaces, apparatuses, systems or processes described in this disclosure can constitute machine-executable components or modules embodied within machine(s), e.g., embodied in one or more computer readable mediums (or media) associated with one or more machines. Such components or modules, when executed by the one or more machines, e.g., computer(s), computing device(s), virtual machine(s), etc. can cause the machine(s) to perform the operations described. Client device 202 can include memory 212 for storing computer executable components and instructions. Client device 202 further includes a processor 214 to facilitate operation of the instructions (e.g., computer executable components and instructions) by client device 200.

As used in this disclosure, the terms "content consumer" or "user" refers to a person, entity, system, or combination thereof. Client device 202 can include any suitable computing device associated with a user and configured to execute GUI activities grid module 204 and/or provide a GUI activities grid. In some aspects, a user can interface with a client device 202 using an auxiliary input device, such as a remote controller. For example, client device 202 can include a television, a smart television, a desktop computer, a laptop computer, a cellular phone, a smartphone, a tablet personal computer (PC), or a personal digital assistant (PDA). In an aspect, client device 202 can generate a hologram of an activities grid configured by GUI activities grid module, as opposed to a graphical input display on a display screen of client device 202.

GUI activities grid module 204 is configured to generate and present a GUI having an activities grid as described herein. For example, GUI activities grid module 204 can generate and present activities grid 100 (and the like) at client device 202 via a display screen of client device 202. Additional examples of GUI activities grids in accordance with aspects described herein are presented in FIGS. 6-9. However, common features of the various GUI activities grids capable of generation, configuration and/or presentation by GUI activities grid module 204 include at least a plurality of cells configured to receive input data. The respective cells are arranged in a circle and defined by a plurality of concentric circles and a plurality of radial lines extending from a shared center point of the concentric circles. Two consecutive concentric circles can define a row and two consecutive radial lines can define a slice. Each of the rows and slices respectively correspond to different input categories. In an aspect, the plurality of slices correspond to input categories having a sequential nature, such as sequential segments of time of a fixed time period (e.g., 24 slices representing 24 hours in a day).

Grid configuration component 206 is configured to generate and/or configure a GUI activities grid (e.g., grid 100 and the like). In an aspect, a GUI activities grid can be preconfigured/designed to include a specific number of rows and slices and the respective rows and slices can be pre-associated with input categories. However in another aspect, grid configuration component 206 can receive user input regarding the appearance and configuration of a GUI activities grid. For example, a user can select a number of rows and slices to include in a GUI activities grid. A user can also dictate the size and shape of the rows and slices. The user can further provide input defining the information categories represented by the respective rows and slices. According to this aspect, a user can employ grid configuration component 206 to design an activities grid in accordance with aspects described herein. In an aspect, grid configuration component 206 can further receive user input regarding the type of data input for filling the respective cells of an activities grid. For example, a user can fill cells of an activities grid with text and/or designate certain symbols, marks and/o colors to represent different types of information to be filled into the respective cells.

The input categories represented by the respective rows and slices can vary. In an aspect, where an activities grid is configured to track and display information pertaining to daily activities of a user, the slices can correspond to different hours in a day. According to this aspect, the rows can correspond to information categories related to attributes associated with who the user interacts with throughout the day, what the user does in his day, where the user goes in his day, why the user performs various actions, how the user performs various actions, or what the user is thinking or feeling throughout the day. For example, input categories represented by respective rows could include but are not limited to: Example input categories that can be represented by rows of a GUI activities grid configured to track and display aspects of a users day can include but are not limited to: activities the user participates in (e.g., work, gym, family, school, driving, social, philanthropy, errands, shopping, etc.), different locations the user frequents, meals the user eats, devices the user employs and activities performed on the devices, people the user interacts with, or what the user is wearing.

Presentation component 208 is configured to present or display a GUI activities grid/chart generated/configured by grid configuration component 206. Presentation component 208 can present a GUI activities grid (e.g., grid 100 and the like) for use with any suitable type of computing device, for example a mobile phone, a tablet computer, a desktop computer, a server system, a personal computer, a cable set top box, satellite set top box, a television set, an internet-enabled television, a television computer device media extender device, video cassette recorder device, a blu-ray device, a video game system, an audio/video receiver, a radio device, a portable music player, a navigation system, etc.

The respective devices listed above often have different capabilities and limitations (e.g., screen size, decoders . . . ). In an aspect, presentation component 208 can provide presentation options in accordance with different device capabilities or limitations. For example, data rendering capabilities may be more limited in a mobile device (e.g., a smart-phone) than in a fixed computing device (e.g., a desktop computer). In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 208 can generate user options to account for variations in device functionality and available bandwidth for consumption and rendering of media content.

In view of the above, presentation component 208 can present GUI interfaces generated/configured by grid configuration component 206 in various formats and/or in accordance with various display mediums. In particular, presentation component 208 can adapt and optimize display of options and content based on respective client devices (e.g., based on screen size, screen resolution, input capabilities of the client devices, processing capabilities etc.). For example, presentation component 208 can adapt the size, shape, and number of cells of a GUI activities grid based on the size and orientation of a display screen of a client device at which the GUI activities grid is displayed.

Input component 210 is configured to facilitate user interaction with a GUI activities grid displayed at client device 202. In particular, input component 210 can be configured to receive commands from an input device associated with client device 202 (e.g., a controller, a keyboard, a mouse, a touch screen, voice recognition input device, a gesture recognition input device, etc., (not shown)), and interpret those commands to facilitate interaction with a GUI activities grid displayed at client device 202. For example, input component 210 can receive commands from a user to fill cells of a GUI activities grid with information (e.g., text, colors, symbols, etc.).

Figure 3:
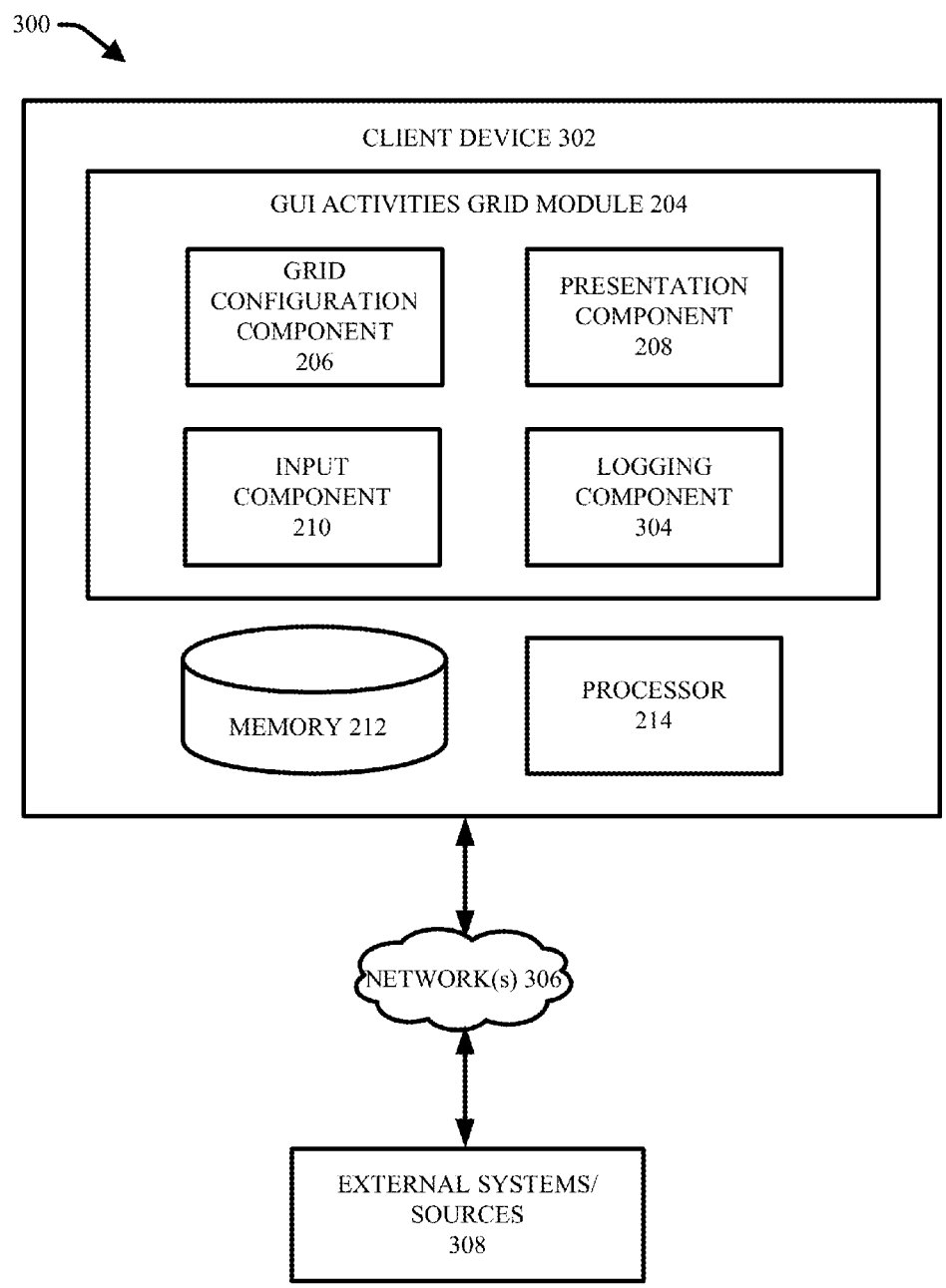
FIG. 3 illustrates a block diagram of another example system that facilitates tracking and displaying user activities over a predetermined time period in accordance with various aspects and embodiments described herein.

FIG. 3 presents an example system 300 for generating and presenting an activities grid (e.g., grid 100 and the like) in accordance with aspects and embodiments described herein. System 300 includes client device 302 and one or more networks 306 connecting client device 302 with various external systems and sources. Network(s) 306 can include but are not limited to a cellular network, a wide area network (WAD, e.g., the Internet), or a local area network (LAN). For example, a client device 302 can communicate with an external system or source using virtually any desired wired or wireless technology, including, for example, cellular, WAN, wireless fidelity (Wi-Fi), Wi-Max, WLAN, and etc. Repetitive description of like elements employed in respective embodiments of systems and interfaces described herein are omitted for sake of brevity.

External systems and sources 308 can include a variety of systems and sources accessible to client device 302 via a network and that provide information and/or functionality that can be utilized by GUI activities grid module 204. For example, client device 302 is similar to client device 202 with the addition of logging component 304. Logging component 304 can be configured to automatically fill cells of a GUI configured and/or generated by GUI activities grid module with data using information gathered and/or generated at client device 302 and/or information available at an external system or source 308.

For example, an external system/source can include a website that a user of client device 302 accesses via the client device. In response to access of the website, GUI activities grid module 204 can gather information related to time of access, duration of access, and virtual actions (e.g., searches, communication, data viewing, etc.) performed at the website. Where a GUI activities grid generated by the GUI activities grid module includes cells corresponding to input categories related to access of the website, logging component 304 can automatically fill the cells with information based on the gathered information. For example, a row of a GUI activities grid can correspond to an input category related to web browsing. In response to access of the website, the logging component 304 can fill cells in the row at times (e.g., where the slices of the grid respectively correspond to segments of time) when the website is accessed with information indicating that the website was accessed and what activities were performed in association with access of the website.

In another example, external systems and sources can include systems and/or sources with information related to a users schedule, a users social affiliations, profiles and accounts the user has, and transactions the user performs at the respective accounts. For example, en external source can include a social networking source with information pertaining to a user's friends, preferences and social activities (e.g., when the user is going to an event, with whom, if the user attended etc.). In another example, an external system can include a global positioning system (GPS) that can facilitate identifying a user's location and information associated with the user's location (e.g., buildings at the location, people/mobile devices at the location, etc.).

Logging component 304 can also be configured to automatically fill cells of a GUI activities grid with information using data collected or generated at the client device 302. For example, where client device 302 includes functionality to identify its location, logging component 304 can fill cells of GUI activities grid pertaining to a location of the user with location information gathered by the client device. In another example, where client device 302 is a cellular phone, logging component 304 can gather information pertaining to communications between the user and other users via the cellular phone and fill corresponding cells of a GUI activities grid with the information.

Figure 4:
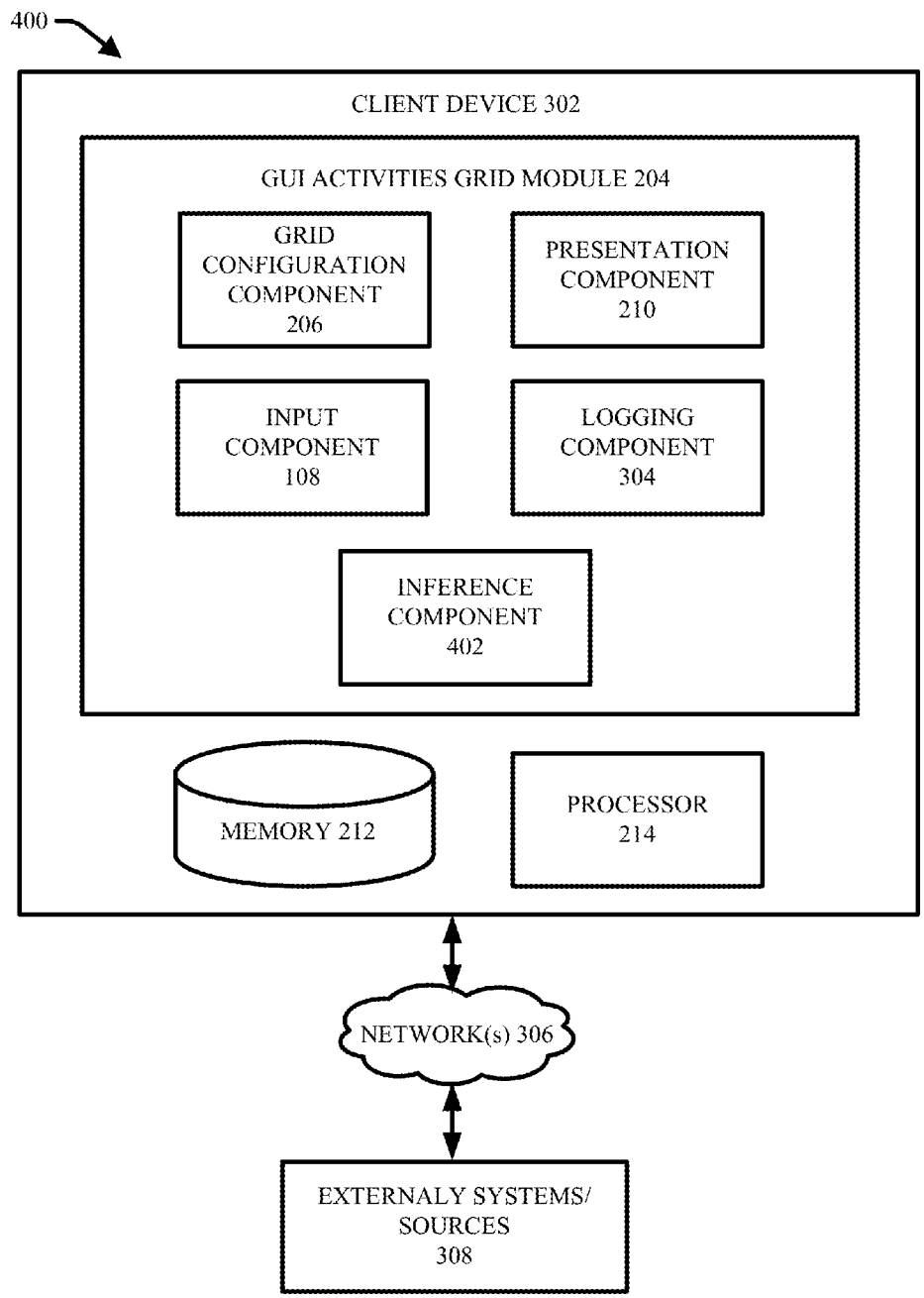
FIG. 4 illustrates a block diagram of another example system that facilitates tracking and displaying user activities over a predetermined time period in accordance with various aspects and embodiments described herein.

FIG. 4 presents another example system 400 for generating and presenting an activities grid (e.g., grid 100 and the like) in accordance with aspects and embodiments described herein. System 400 is similar to system 300 with the addition of inference component 402 to client device 302. Repetitive description of like elements employed in respective embodiments of systems and interfaces described herein are omitted for sake of brevity.

Inference component 402 is configured to provide for or aid in various inferences or determinations associated with aspects of GUI activities grid module 204. For example, inference component 402 can infer information to fill into and/or associate with respective cells of a GUI activities grid based on information categories represented by the respective rows and slices of the GUI activities grid and information available at external systems/sources 308 and or gathered and/or generated at client device (e.g., related to usage of client device, related to virtual activity of the user, related to user preferences, related to user routines, related to user/device location, related to user social connections, etc.). In aspect, all or portions of client device 302 can be operatively coupled to inference component 402. Moreover, inference component 402 can be granted access to all or portions of external systems/sources 308.

In order to provide for or aid in the numerous inferences described herein, inference component 402 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
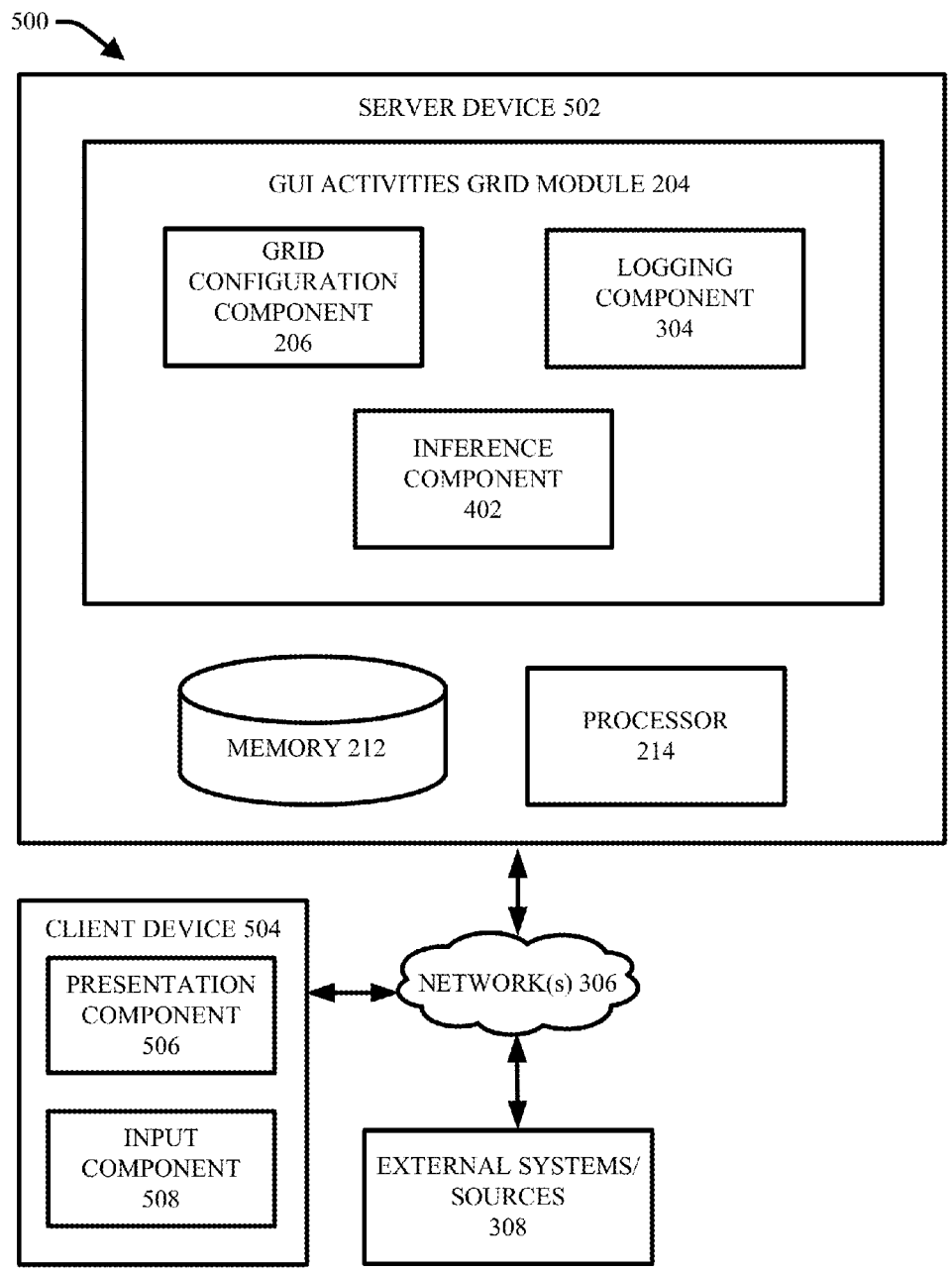
FIG. 5 illustrates a block diagram of another example system that facilitates tracking and displaying user activities over a predetermined time period in accordance with various aspects and embodiments described herein.

FIG. 5 presents another example system 500 for generating and presenting an activities grid (e.g., grid 100 and the like) in accordance with aspects and embodiments described herein. Repetitive description of like elements employed in respective embodiments of systems and interfaces described herein are omitted for sake of brevity.

Similar to systems 300 and 400, system 500 includes a client device 504, one or more networks 306 and one or more external system/sources 308. Client device 504 can include similar features and functionalities as client devices 202 and 302. For example, client device 504 can include presentation component 506 and input component 508. Presentation component 506 and input component 508 can operate in accordance with presentation component 208 and input component 210 respectively. However, unlike systems 300 and 400, GUI activities grid module is provided at an external server device 502 accessible to client device 504 via a network 306. According to this aspect, an external system can configured, generate, and store a GUI activities grid and a client device 504 can access and interact with the GUI activities grid via a network 306. For example, presentation component 506 can access a GUI activities grid configured by and stored at the server device 502 using a browser or web application associated with the client device 504.

FIGS. 6-9 present various GUI activities grids capable of being configured and/or generated by GUI activities grid module 204 and displayed at a client device (e.g., client devices 202, 302, 506 and the like) in accordance with various aspects and embodiments disclosed herein. Repetitive description of like elements employed in respective embodiments of systems and interfaces described herein are omitted for sake of brevity.

Figure 6:
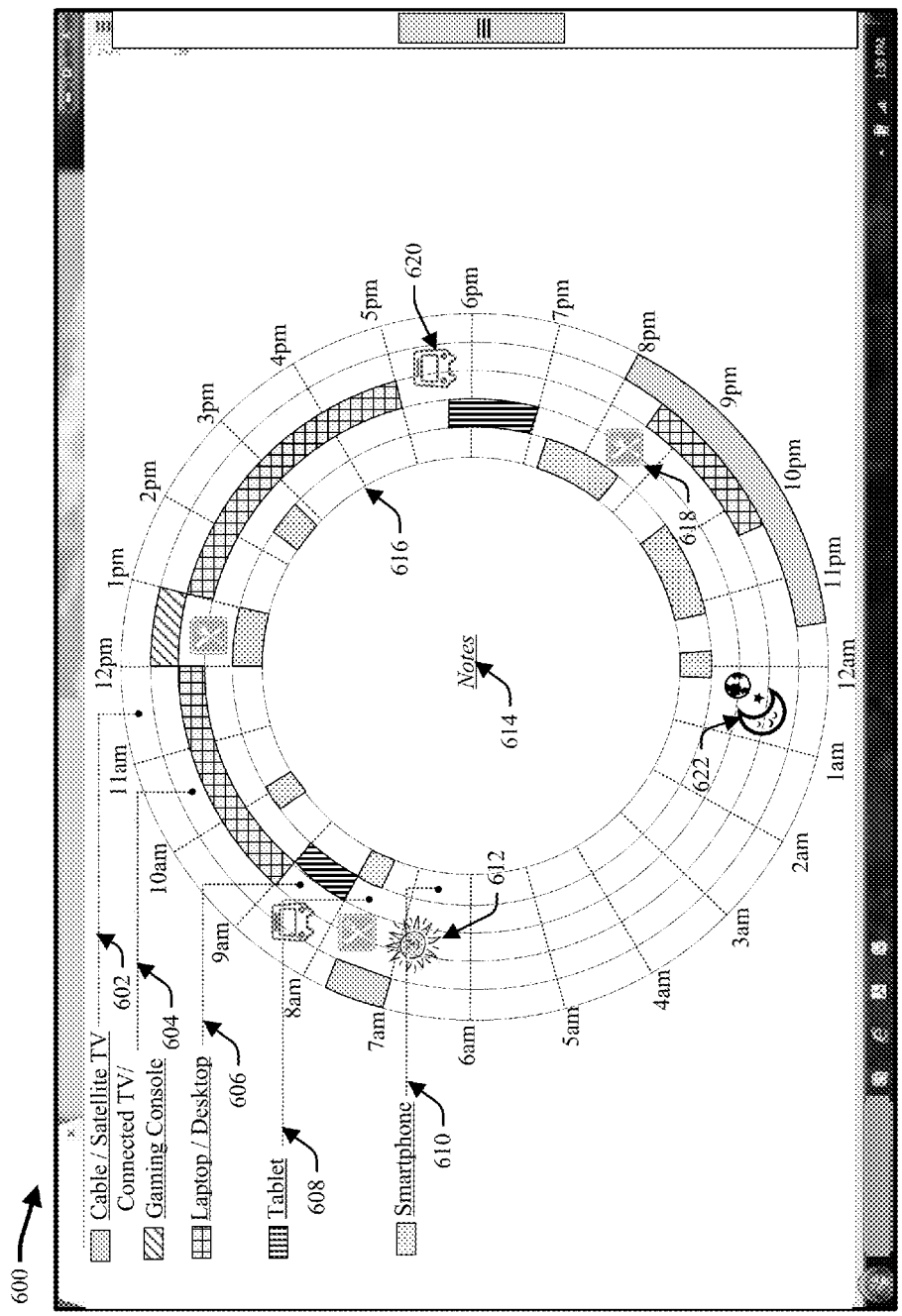
FIG. 6 illustrates a schematic representation of another example layout of a GUI activities grid, in accordance with various aspects and embodiments described herein.

Turning now to FIG. 6, presented is an example GUI activities grid 600 displayed via a display screen of a client computing device (e.g., via presentation component 208). For example, the client computing device can include a desktop, laptop, or tablet PC. GUI activities grid 600 includes a plurality of slices corresponding to hour segments of a 24 hour period. For example, respective radial lines 616 each correspond to an hour of a 24 hour day period. It should be appreciated that although radial lines 616 are configured to correspond to hour increments, activities grid 600 (and the like) can be tailored to include any number N of radial lines corresponding to any sequential in input category or attribute of the input category. For example, the radial lines can be cut in half to correspond to a 12 hour period, such that activities grid 600 resembles a clock. In another example, additional radial lines can be included to divide hour increments into half hour increments, quarter hour increments, etc.

Activities grid 600 further includes five rows established via a plurality (six) concentric circles. Each of the rows are configured to represent an input category. The input categories assigned to the respective rows are noted via the dashed reference lines 602, 604, 606, 608 and 610, respectively stemming from the respective rows. For example, the outmost row 602 corresponds to cable/satellite TV, the next row 604 corresponds to gamming console, the next row 606 corresponds to laptop/desktop, the next row 608 corresponds to tablet, and the innermost row 610 corresponds to smartphone. In an aspect, activities grid 600 can be associated with a legend that includes information referencing row input category assignments. In another aspect, in response to selection, movement of a cursor over, or otherwise interaction with a row, a pop dialog box or overlay can be configured to appear and display information associated with the row, such as the input category represented by the row.

Activities grid 600 is configured to facilitate tracking and displaying information regarding multiple device usage of a user over the course of a 24 hour period. In particular, with activities grid 600, a user can easily input data into the respective cells of the activities grid representing which device the user used at certain times throughout the day. For example, when a user uses the respective devices represented by the respective rows throughout the day, the user can mark cells corresponding to the respective devices at the slices corresponding to the times during which the respective devices were used. For example, as seen in activities grid 600, the cells corresponding to row 606 from times 9 am to 12 pm are filled in, indicating that the user employed his or her desktop or laptop during those hours. As exemplified with respect to activities grid 600, a user can indicate a device was used merely by coloring in or filling in cells. Using this technique, a user can easily color in segments of a row to correspond to an amount of time a device was used. The user can partially fill in a cell to indicate that a fraction of the amount of time associated with the cell was used. for example, the cell corresponding to row 608 from 6 pm to 7 pm is entirely filled in while the cell corresponding to row 608 from 5 pm to 6 pm is partially filled in, indicating that the user employed his or her tablet from about 5:45 pm to 7 pm.

In order to easily differentiate between the respective devices, each row or device can be associated with a different input fill color and/or pattern. However, it should be appreciated that cells of activities grid 600 (and the like) can be filled with a variety of input data that can be distinguished with colors, marks, symbols, text, etc. In an aspect, the respective cells can further be associated with multimedia input data (e.g., images, video, audio, etc.). According to this aspect, in response to interaction with the respective cells, data associated with the respective cells can be revealed (e.g., via a dialog box or overlay).

In addition to merely filling rows corresponding to devices used at the respective time at which the devices where used, activities grid 600 can be decorated with a variety of information by a user to facilitate noting and recording information associated with the user's day. For example, activities grid 600 can include a notation section 614 in the center of the grid in which the user can freely provide information (e.g., via text, via a drawing tool, etc.) that is not defined by a cell. In another aspect, activities grid 600 can be decorated with symbols, (e.g., images, stickers, tags, thumbnails), that are representative of information. According to this aspect, a user can easily tag areas of an activities grid (e.g., corresponding to a slice and or a row) with information using symbols representative of the information.

For example, symbol 618 can represent the activity of eating and used to mark areas of activities grid to indicate when the user had a meal. Symbol 620 can be used to indicate driving or transportation and used to mark times of the day when the user is driving or commuting. Symbol 622 can represent the activity of going to bed and symbol 612 can be used to indicate when the user wakes up for the day. For example, as seen in activities grid 600, the user had a meal between 7 am and 8 am, 12 pm and 1 pm, and 8 pm and 9 pm. The user went to bed just after 12 am and woke up at 7 am, can commuted between 8 am to 9 am and between 5 pm and 6 pm. As exemplified with activities grid 600, the subject activity grid data input techniques facilitate inputting, organizing, tracking and displaying a variety of different types of information associated with activities of a user throughout the day.

Figure 7:
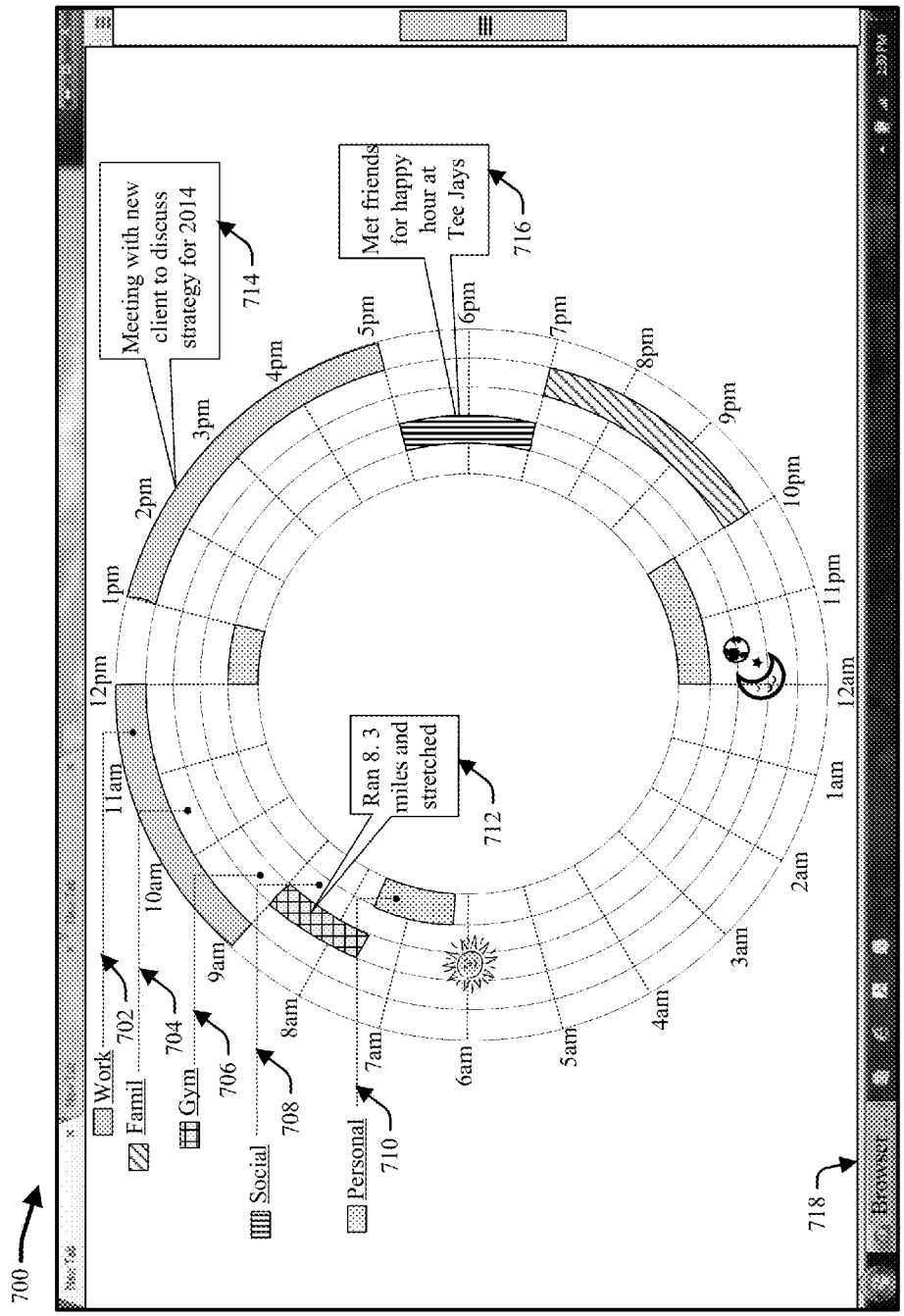
FIG. 7 illustrates a schematic representation of another example layout of a GUI activities grid, in accordance with various aspects and embodiments described herein.

FIG. 7 presents another example GUI activities grid 700 displayed via a display screen of a client computing device (e.g., a desktop, laptop, or tablet PC). In an aspect, GUI activities grid 700 is generated/configured by a server device/system (e.g., server device 502) and accessed via a computing device via a network and presented at the computing device using a browser 718 of the computing device (e.g., via presentation component 506). GUI activities grid 700 includes same or similar features and functionality as activities grid 600.

Activities grid 700 is configured to facilitate tracking and displaying information regarding activities of a user over 24 hour period. In particular, with activities grid 600, a user can easily input data into the respective cells of the activities grid representing different activities the user participates in throughout the day and when the user participates in those activities. For example, the outermost row 702 can represent the activity of work, the next row 704 can represent the activity of spending time with family, the next row 706 can represent the activity of going to the gym, the next row 708 can represent the activity of spending social time with friends, and the innermost row 710 can represent personal time.

Similar to activities grid 600, using activities grid 700, a user can fill cells with colors or marks to indicate activities performed at respective times of the day. A user can further decorate activities grid 700 with symbols or tags to indicate a variety of information (e.g., going to bed or waking up). In addition, a user can associate text with rows and/or cells of activities grid to journal or describe attributes associated with the user's day. The text can be associated with the respective cells in the form of call out boxes or overlays that can be displayed in response to interaction with the respective areas of actives grid 700 at which the call out boxes/overlays are integrated. For example, call out boxes 712, 714 and 716 respectively include notes provided by the user regarding the activities performed between 8 am and 9 am, 2 pm and 3 pm, and 5 pm and 7 pm, respectively.

Figure 8:
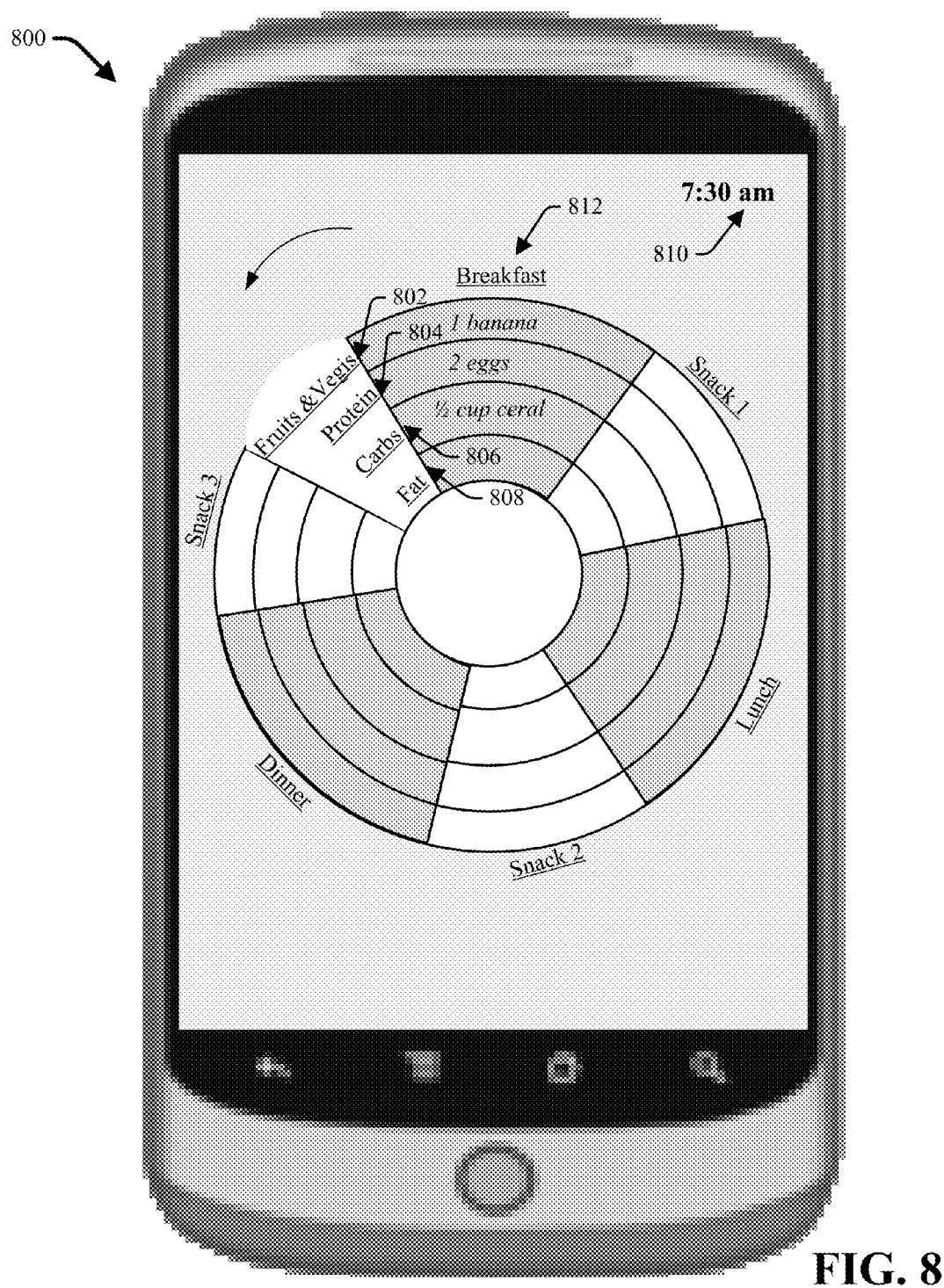
FIG. 8 illustrates a schematic representation of another example layout of a GUI activities grid, in accordance with various aspects and embodiments described herein.
Figure 9:
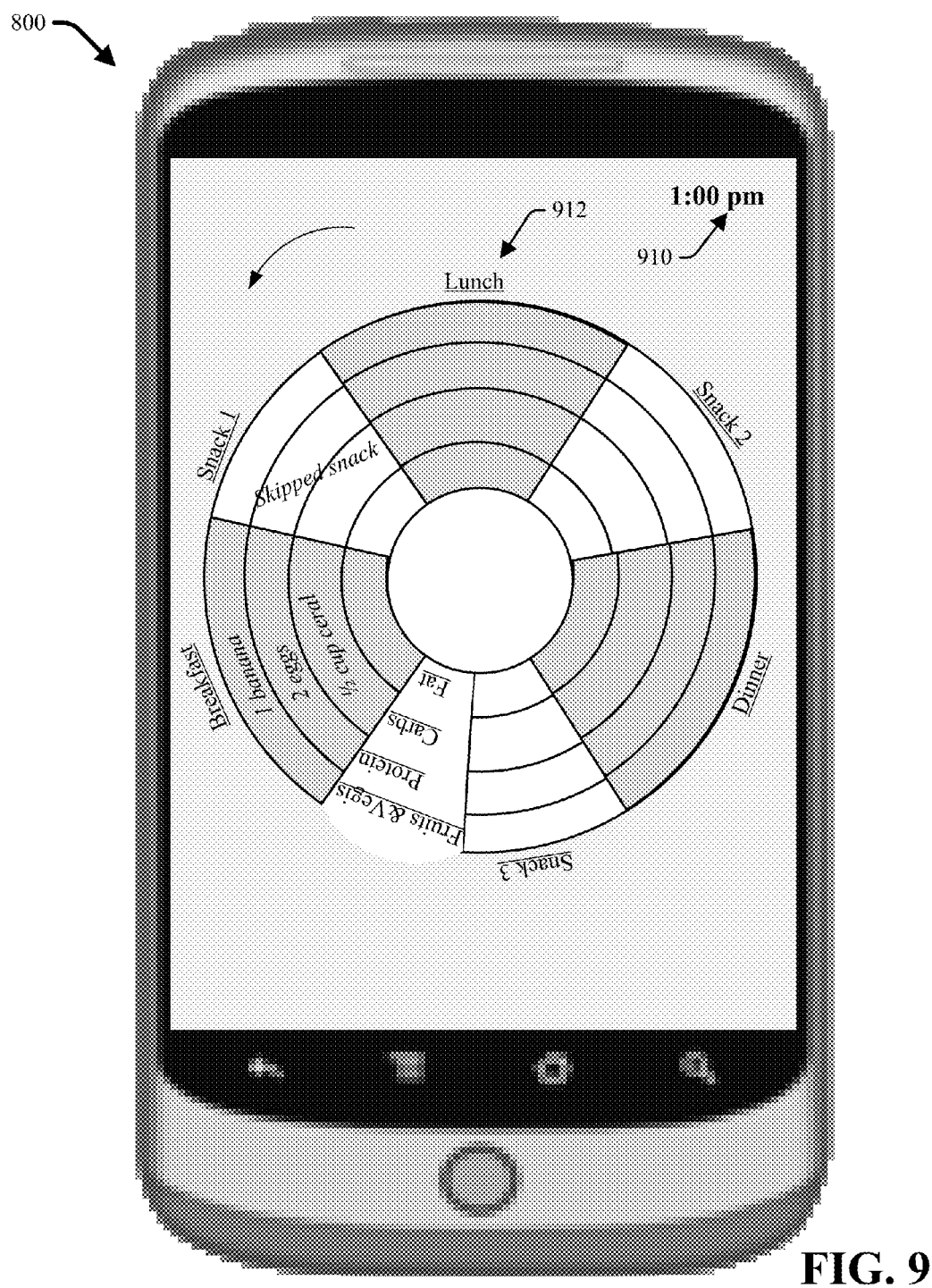
FIG. 9 illustrates a schematic representation of another example layout of a GUI activities grid, in accordance with various aspects and embodiments described herein.

FIGS. 8-9 present another example GUI activities grid 800 displayed via a display screen of a client computing device that is a tablet PC or smartphone. GUI activities grid 800 includes same or similar features and functionality as activities grids 100, 600 and 700 (and vice versa). GUI activities grid 800 is configured to receive input regarding food consumed by a user over the course of a day. GUI activities grid 800 includes six slices and four rows. The respective slices correspond to the input categories of breakfast, snack 1, lunch, snack 2, dinner, and snack 3. The respective rows correspond to input categories of food groups. For example, when looking at FIG. 8, row 802 can represent fruits and vegetables, row 804 can represent protein, row 806 can represent carbohydrates, and row 808 can represent fats.

In an aspect, GUI activities grid is designed to facilitate tracking food consumption according to a meal plan having three meals and three snacks spread throughout the day. Using GUI activities grid, a user can easily input data noting food consumed over the course of the day. For example, as seen in interface 800, the user has input text into corresponding cells of GUI grid 800 indicating the food consumed with respect to the different food groups at breakfast.

In an aspect, input categories represented by respective slices can be correlated to times of the day. According to this aspect, as the time changes, GUI activities grid 800 can be configured to rotate in accordance with the time change such that the slice corresponding to a current time is arranged at the top and center view of the display screen. For example, the meals and snacks associated with GUI activities grid 800 can be tied to different times of the day. For example, breakfast can be associated with 7:30 am, snack 1 can be associated with 10:30 am, lunch can be associated with 1:00 pm, etc. As seen in FIG. 8, when the time (arrow 810) is 7:30 am, the breakfast slice is at situated at the top and center position 812 of the display. As seen with reference to FIG. 9, as the time changes to 1:00 pm (arrow 910), the GUI activities grid can rotate counterclockwise such that the lunch slice is positioned at the top and center area of the display.

Figure 10:
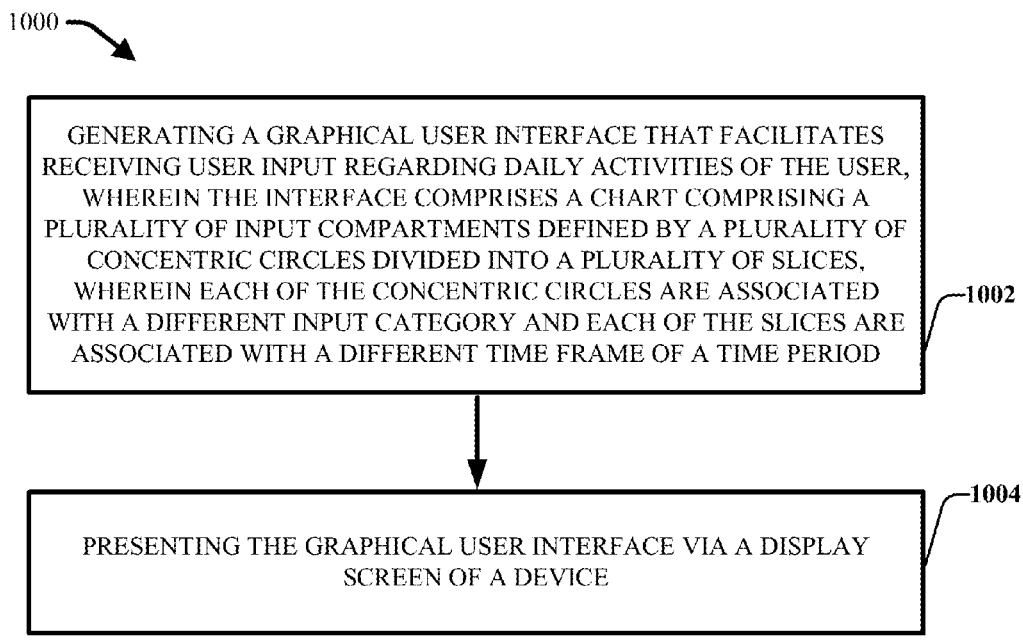
FIG. 10 illustrates a flow chart of an example method for generating and presenting a GUI activities grid in accordance with aspects and embodiments described herein.
Figure 11:
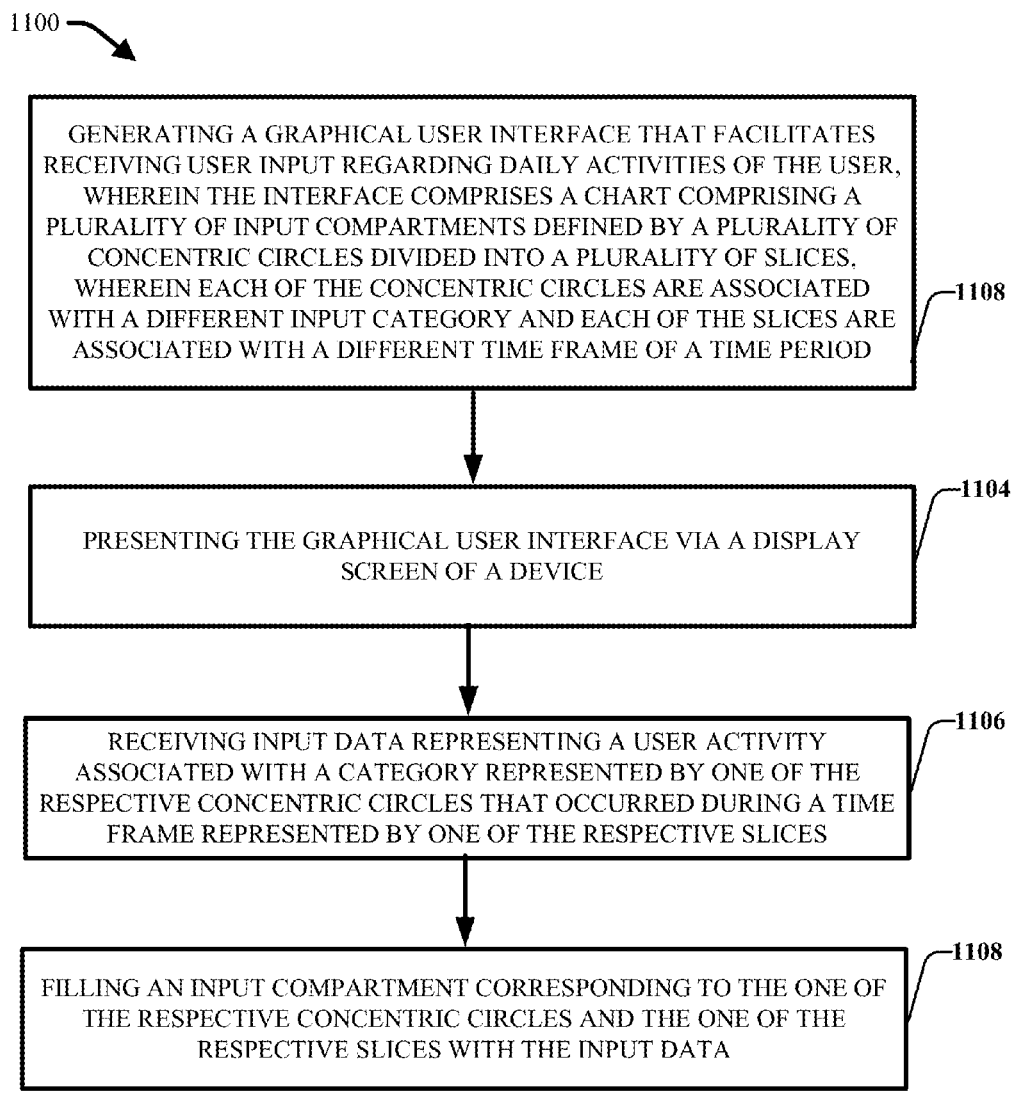
FIG. 11 illustrates a flow chart of another example method for generating and presenting a GUI activities grid in accordance with aspects and embodiments described herein.
Figure 12:
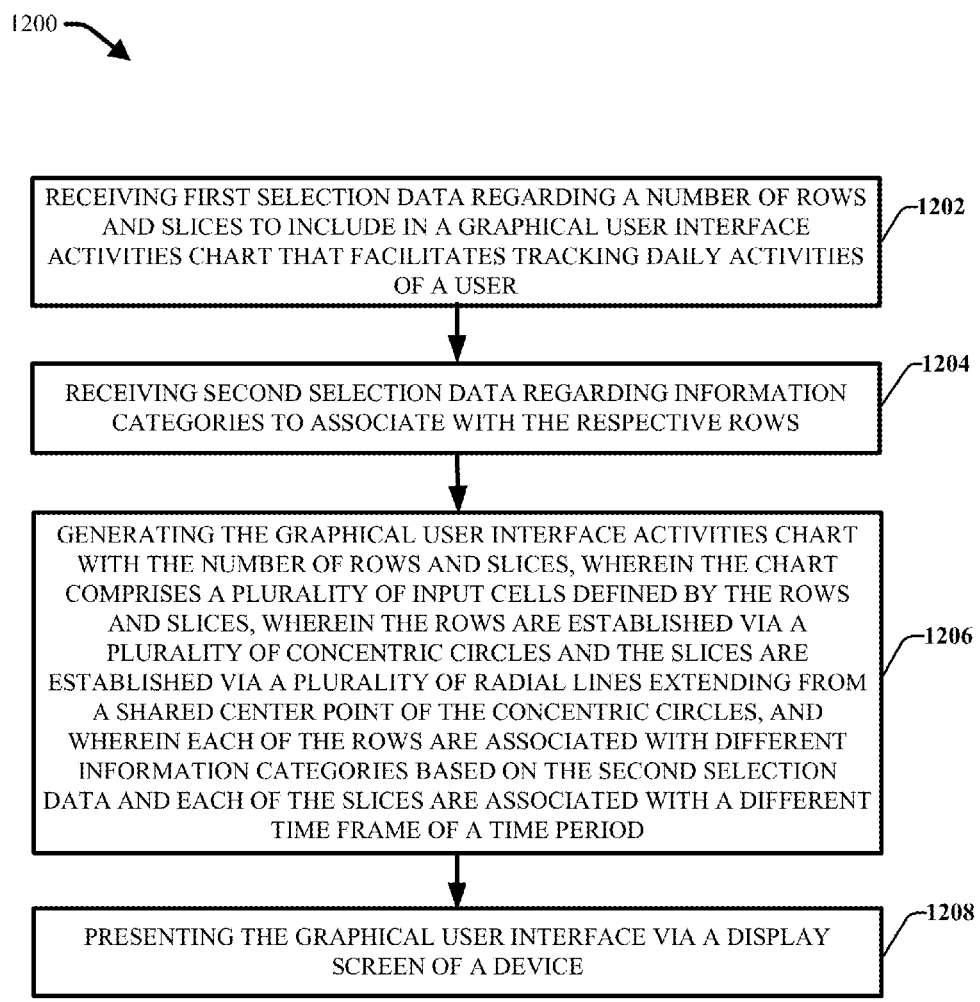
FIG. 12 illustrates a flow chart of another example method for generating and presenting a GUI activities grid in accordance with aspects and embodiments described herein.

In view of the example systems/interface described herein, example methods that can be implemented in accordance with the disclosed subject matter can be further appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 for generating and presenting an activities grid (e.g., grid 100 and the like) in accordance with aspects and embodiments described herein. At 1002, a graphical user interface is generated that facilitates receiving user input regarding daily activities of the user (e.g., via grid configuration component 206). The interface includes a chart having a plurality of input compartments defined by a plurality of concentric circles divided into a plurality of slices, wherein each of the concentric circles are associated with a different input category and each of the slices are associated with a different time frame of a time period. At 1004, the graphical user interface is presented via a display screen of a device.

FIG. 11 illustrates a flow chart of another example method 1100 for generating and presenting an activities grid (e.g., grid 100 and the like) in accordance with aspects and embodiments described herein. At 1102, a graphical user interface is generated that facilitates receiving user input regarding daily activities of the user (e.g., via grid configuration component 206). The interface includes a chart having a plurality of input compartments defined by a plurality of concentric circles divided into a plurality of slices, wherein each of the concentric circles are associated with a different input category and each of the slices are associated with a different time frame of a time period. At 1104, the graphical user interface is presented via a display screen of a device (e.g., via presentation component 208 or presentation component 506). At 1106, input data is received representing a user activity associated with a category represented by one of the respective concentric circles that occurred during a time frame represented by one of the respective slices. Then at 1108, an input compartment corresponding to the one of the respective concentric circles and the one of the respective slices is filled with the input data.

FIG. 12 illustrates a flow chart of an example method 1200 for generating and presenting an activities grid (e.g., grid 100 and the like) in accordance with aspects and embodiments described herein. At 1202, first selection data is received regarding a number of rows and slices to include in a graphical user interface activities chart that facilitates tracking daily activities of a user. At 1204, second selection data is received regarding information categories to associate with the respective rows. At 1206, the graphical user interface activities chart is generated with the number of rows and slices. The chart includes a plurality of input cells defined by the rows and slices, wherein the rows are established via a plurality of concentric circles and the slices are established via a plurality of radial lines extending from a shared center point of the concentric circles. Further, each of the rows are associated with different information categories based on the second selection data and each of the slices are associated with a different time frame of a time period. Then at 1208, the graphical user interface is presented via a display screen of a device.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 13:
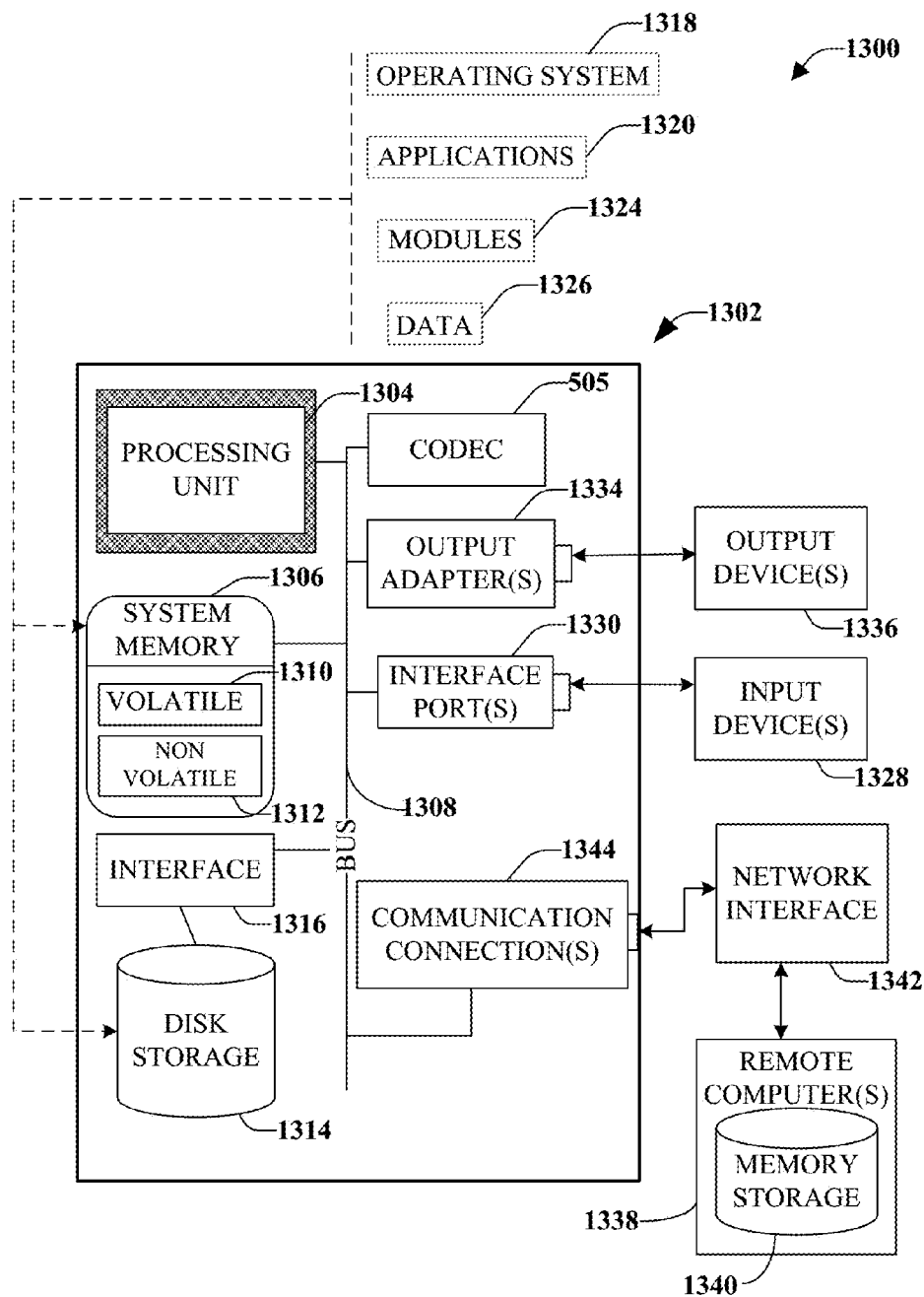
FIG. 13 is a schematic block diagram illustrating a suitable operating environment in accordance with various aspects and embodiments.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory.

According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s). Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
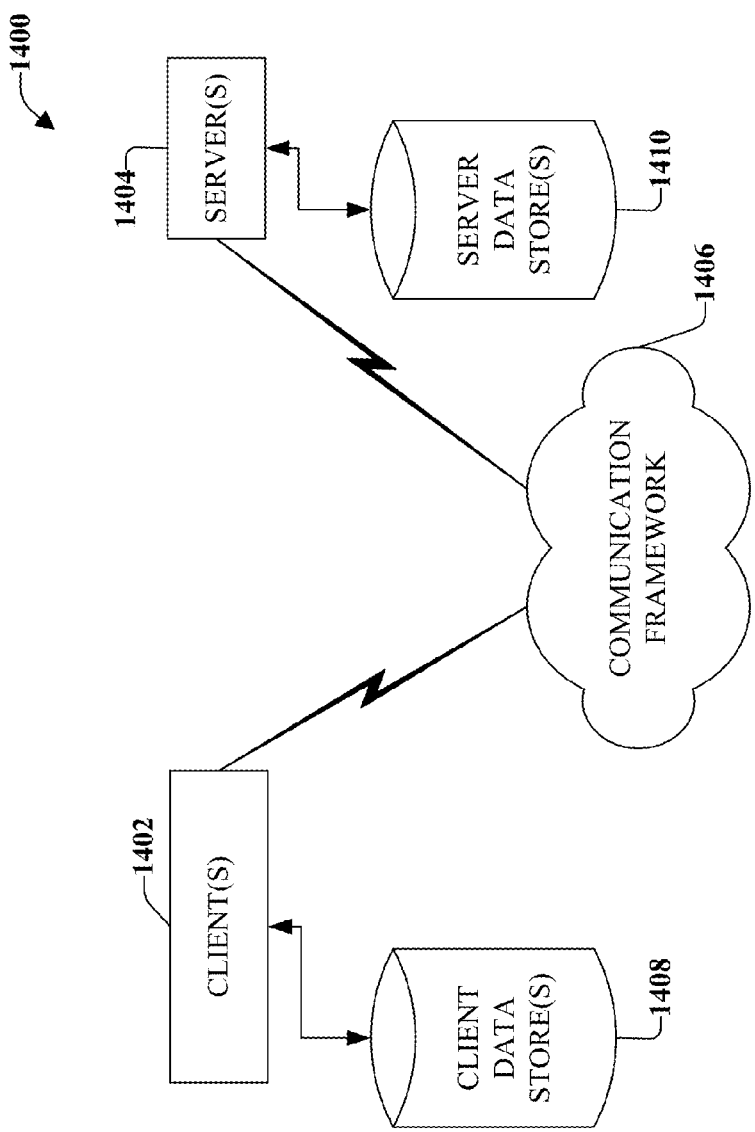
FIG. 14 is a schematic block diagram of a sample-computing environment in accordance with various aspects and embodiments.

Referring now to FIG. 14, there is illustrated a schematic block diagram of a computing environment 1400 in accordance with this disclosure. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a metadata, e.g., associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 1408 that can be employed to store information local to the client(s) 1402 (e.g., associated contextual information). Similarly, the server(s) 1404 are operatively include or are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
a memory; and
a processor, coupled to the memory, to:
generate a graphical user interface comprising a graphical element to facilitate recordation of information pertaining to a user over a time period, the graphical element comprising:
a plurality of concentric rows formed by a plurality of concentric circles sharing a center point, wherein each subsequent concentric circle of the plurality of concentric circles is successively larger than a preceding concentric circle to define a plurality of concentric rows extending from the center point, wherein the plurality of rows represent a plurality of categories, wherein the plurality of categories represent user activity corresponding to at least one mobile device of the user;
a plurality of columns formed by a plurality of radial lines that originate from the center point and intersect the plurality of concentric circles, wherein the plurality of columns represent sequential segments of time of the time period; and
a plurality of cells formed by an intersection of the plurality of concentric rows and the plurality of columns, wherein the plurality of rows and the plurality of cells are configured to receive input; and
provide the graphical user interface with the graphical element for presentation within a display screen of a user device;
cause a rotation of the graphical element within the display screen responsive to a current time associated with the user device; and
receive the input at the plurality of cells, the input representing user activities performed during different segments of time of the time period.

2. The system of claim 1, the processor further to:
fill the plurality of cells with the input.

3. The system of claim 2, wherein the input comprises text representing the user activity.

4. The system of claim 2, wherein the input comprises a symbol representing the user activity.

5. The system of claim 2, wherein the input comprises a color representing the user activity.

6. The system of claim 1, wherein an outermost concentric circle of the plurality of concentric circles is marked with time of day indicators at respective columns of the plurality of columns.

7. The system of claim 1, wherein each of the plurality of columns are sequentially associated with a different segment of time of a twenty four hour time period.

8. The system of claim 1, wherein the at least one mobile device of the user comprises at least one of a mobile phone, a personal computer, or a tablet computer.

9. A method comprising:
generating, by a processor, a graphical user interface comprising a graphical element to facilitate recordation of information pertaining to a user over a time period, the graphical element comprising:
a plurality of concentric rows formed by a plurality of concentric circles sharing a center point, wherein each subsequent concentric circle of the plurality of concentric circles is successively larger than a preceding concentric circle to define a plurality of concentric rows extending from the center point, wherein the plurality of rows represent a first plurality of categories, wherein the plurality of categories represent user activity corresponding to at least one mobile device of the user;
a plurality of columns formed by a plurality of radial lines that originate from the center point and intersect the plurality of concentric circles, wherein the plurality of columns represent sequential segments of time of the time period; and
a plurality of cells formed by an intersection of the plurality of concentric rows and the plurality of columns, wherein the plurality of rows and the plurality of cells are configured to receive input; and
providing, by the processor, the graphical user interface with the graphical element for presentation within a display screen of a user device;
causing a rotation of the graphical element within the display screen responsive to a current time associated with the user device; and receiving the input at the plurality of cells, the input representing user activities performed during different segments of time of the time period.

10. The method of claim 9, further comprising receiving the input from a user of the user device.

11. The method of claim 9, wherein the input comprises at least one of, text, a symbol, or a color representing the user.

12. The method of claim 9, wherein an outermost concentric circle of the plurality of concentric circles is marked with time of day indicators at respective columns of the plurality of columns.

13. The method of claim 9, wherein each of the plurality of columns are sequentially associated with a different segment of time of a twenty four hour time period.

14. A non-transitory computer-readable storage medium comprising instructions that, when executed by a computing system, cause the computing system to perform operations comprising:
   generating, by a processor of the computing system, a graphical user interface comprising a graphical element to facilitate recordation of information pertaining to a user over a time period, the graphical element comprising:
      a plurality of concentric rows formed by a plurality of concentric circles sharing a center point, wherein each of subsequent concentric circles of the plurality of concentric circles is successively larger than a preceding concentric circle to define a plurality of concentric rows extending from the center point, wherein the plurality of rows represent a first plurality of categories, wherein the plurality of categories represent user activity corresponding to at least one mobile device of the user;
      a plurality of columns formed by a plurality of radial lines that originate from the center point and intersect the plurality of concentric circles, wherein the plurality of columns represent sequential segments of time of the time period; and
      a plurality of cells formed by an intersection of the plurality of concentric rows and the plurality of columns, wherein the plurality of rows and the plurality of cells are configured to receive input; and
   providing the graphical user interface with the graphical element for presentation within a display screen of a user device;
   causing a rotation of the graphical element within the display screen responsive to a current time associated with the user device; and
   receive the input at the plurality of cells, the input representing user activities performed during different segments of time of the time period.

15. The non-transitory computer-readable storage medium of claim 14,
   wherein the at least one mobile device of the user comprises at least one of a mobile phone, a personal computer, or a tablet computer.

* * * * *